(12) United States Patent
Fenton et al.

(10) Patent No.: US 11,681,173 B2
(45) Date of Patent: Jun. 20, 2023

(54) IMAGE PANEL HAVING COMPOSITE IMAGE USING COLOR CHANGING WITH BACKLIGHT ILLUMINATION

(71) Applicant: CORNING INCORPORATED, Corning, NY (US)

(72) Inventors: Matthew Wade Fenton, Elmira, NY (US); Joshua Lee Tokar, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/218,479

(22) Filed: Mar. 31, 2021

(65) Prior Publication Data

US 2021/0311348 A1    Oct. 7, 2021

Related U.S. Application Data

(60) Provisional application No. 63/004,723, filed on Apr. 3, 2020.

(51) Int. Cl.
*G02F 1/1333* (2006.01)
*G09G 3/34* (2006.01)

(52) U.S. Cl.
CPC ....... *G02F 1/133331* (2021.01); *G09G 3/342* (2013.01); *G09G 3/3413* (2013.01); *F21V 2200/20* (2015.01)

(58) Field of Classification Search
CPC ............ G09G 3/3413; G02F 1/133331; F21V 33/0032; F21V 2200/20
See application file for complete search history.

(56) References Cited

U.S. PATENT DOCUMENTS 7,793,448 B1 * 9/2010 Huang .................... G09F 13/18
                                                              362/294
9,945,539 B1    4/2018 Su et al.
(Continued)

FOREIGN PATENT DOCUMENTS

BE          420700 A      3/1937
EP        2385630 A2    11/2011
(Continued)

OTHER PUBLICATIONS

European Patent Application No. 21166634.2, Extended European Search Report dated Aug. 3, 2021; 8 pages; European Patent Office.

*Primary Examiner* — Zheng Song

(57) ABSTRACT

Embodiments of an image panel are provided. The image panel includes a transparent substrate having a first major surface and a second major surface opposite the first major surface. A first image layer is disposed on the second major surface. A diffuser layer is disposed on the first image layer, and a second image layer is disposed on the diffuser layer. The second image layer includes mask regions and image regions. An optical density of the image panel is at least 3.0 in the mask regions and less than 3.0 in the image regions. The image regions are not visible from the first major surface when light is not incident upon the second major surface. The image regions are visible from the first major surface and form a composite image with the first image layer when light is incident upon the second major surface.

13 Claims, 3 Drawing Sheets

(56) References Cited

U.S. PATENT DOCUMENTS

| | | | |
|---|---|---|---|
| 2010/0186214 A1* | 7/2010 | Judge | B60Q 1/2696 |
| | | | 29/445 |
| 2016/0252656 A1 | 9/2016 | Waldschmidt et al. | |
| 2017/0361211 A1* | 12/2017 | Gaynor | B42D 25/21 |
| 2019/0271884 A1* | 9/2019 | Watanabe | G02F 1/133602 |
| 2019/0360645 A1* | 11/2019 | Chien | G09F 13/18 |
| 2020/0198535 A1* | 6/2020 | Kontani | F21V 7/00 |
| 2021/0284063 A1* | 9/2021 | Wang | B60Q 3/14 |
| 2021/0300265 A1* | 9/2021 | Piccin | B60K 37/02 |

FOREIGN PATENT DOCUMENTS

| | | |
|---|---|---|
| GB | 2281542 A | 3/1995 |
| WO | 2019/055469 A1 | 3/2019 |
| WO | 2020/014064 A1 | 1/2020 |

* cited by examiner

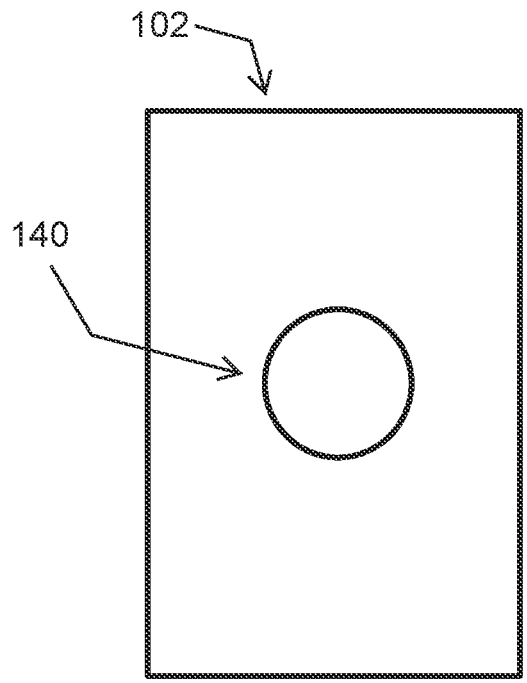
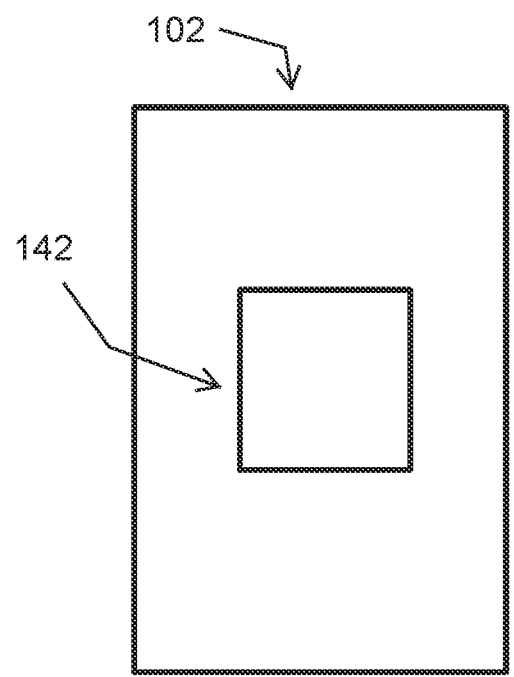
FIG. 5A       FIG. 5B
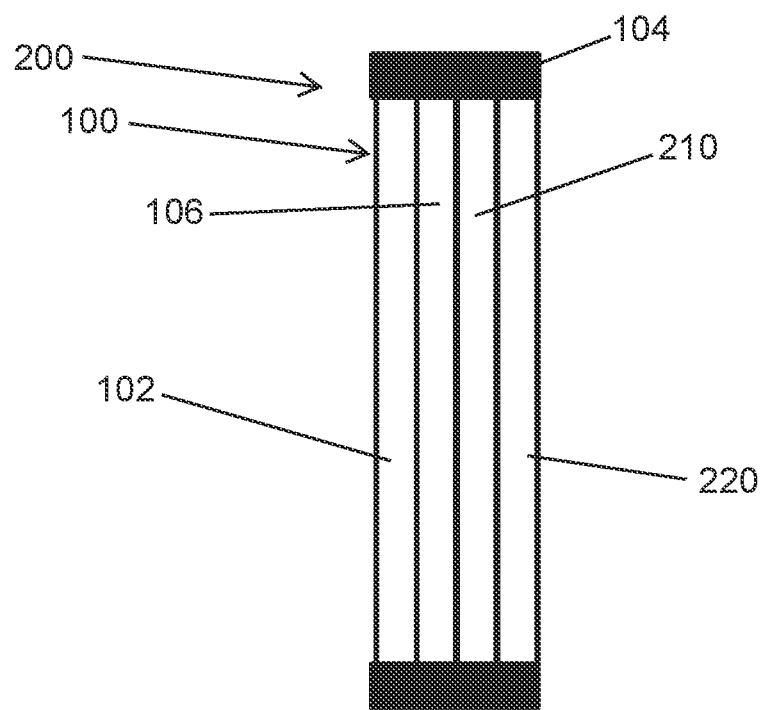
FIG. 6

IMAGE PANEL HAVING COMPOSITE IMAGE USING COLOR CHANGING WITH BACKLIGHT ILLUMINATION

CROSS-REFERENCE TO RELATED APPLICATIONS

This application claims the benefit of priority under 35 U.S.C § 120 of U.S. Provisional Application Ser. No. 63/004,723 filed on Apr. 3, 2020 the content of which is relied upon and incorporated herein by reference in its entirety.

BACKGROUND

The disclosure relates to a decorative image panel, and more particularly to a decorative image panel displaying a first image in ambient light and a composite image when the image panel is backlit.

Glass has been incorporated in decorative, architectural, and electronic designs. In many instances, glass is used specifically for its transparency. However, in other instances, images can be incorporated on or in the glass to provide decorative glass. As glass continues to be engineered for more and varied uses, designers and consumers have looked for different ways to provide decorative effects on the glass surface.

SUMMARY

In one aspect, embodiments of the disclosure relate to an image panel. The image panel includes a transparent substrate having a first major surface and a second major surface. The second major surface is opposite the first major surface. The image panel also includes first image layer disposed on the second major surface of the transparent substrate. A diffuser layer is disposed on the first image layer, and a second image layer is disposed on the diffuser layer. The second image layer includes at least one mask region and at least one image region An optical density of the image panel is at least 3.0 in the at least one mask region and less than 3.0 in the at least one image region. The at least one image region is not visible from the first major surface of the transparent substrate when light is not incident upon the second major surface of the transparent substrate. The at least one image region is visible from the first major surface of the transparent substrate and forms a composite image with the first image layer when light is incident upon the second major surface of the transparent substrate.

In another aspect, embodiments of the disclosure relate to a method of preparing an image panel. In the method, a first image layer is applied on a transparent substrate. The transparent substrate includes a first major surface and a second major surface opposite to the first major surface. The first image layer is disposed on the second major surface. A diffuser layer is applied on the first image layer, and a second image layer is applied on the diffuser layer. The second image layer includes at least one mask region and at least one image region. An optical density of the image panel is at least 3.0 in the at least one mask region and less than 3.0 in the at least one image region. Only the first image layer is visible from the first major surface when no light is incident upon the second major surface, and a composite image of the first image layer and the at least one image region of the second image layer is visible from the first major surface when light is incident on the second major surface.

In still another aspect, embodiments of the disclosure relate to a method of producing an image on an image panel. The image panel includes a transparent substrate, a first image layer disposed on the transparent substrate, a diffuser layer disposed on the first image layer, and a second image layer disposed on the diffuser layer. The second image layer has at least one mask region in which the optical density of the image panel is at least 3.0 and at least one image region in which the optical density of the image panel is less than 3.0. In the method, the second image layer of the image panel is illuminated with a backlight from a rear side of the image panel so that a composite image of the first image layer and the at least one image region is seen from a viewing side of the image panel opposite to the rear side.

In a further aspect, embodiments of the disclosure relate to an image unit. The image unit includes an image panel having a viewing side and a rear side opposite to the viewing side and a backlight on the rear side of the image panel. The image panel includes a transparent substrate having a first major surface on the viewing side and a second major surface on the rear side. A first image layer is disposed on the second major surface of the transparent substrate, and a diffuser layer is disposed on the first image layer. A second image layer having at least one mask region and at least one image region is disposed on the diffuser layer. An optical density of the image panel is at least 3.0 in the at least one mask region and less than 3.0 in the at least one image region. Only a first image defined by the first image layer can be seen from the viewing side when no light is incident upon the rear side of the image panel. The backlight is configured to illuminate the second major surface of transparent substrate such that a composite image of the first image layer and the at least one image region is seen from the viewing side.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. In the drawings:

FIGS. 5A and 5B depict a transition of an image panel from a first image to a new composite image, according to an exemplary embodiment; and FIG. 6 is a schematic depiction of an electronic device having an image unit as a back panel, according to an exemplary embodiment.

DETAILED DESCRIPTION

Referring generally to the figures, various embodiments of an image panel configured to display a composite image when illuminated by a backlight unit are provided. In embodiments, the image panel may be a decorative or architectural panel that displays a first image in ambient light and an image that is a composite of the first image and an underlying image when the panel is backlit. In embodiments, the image panel includes a first image layer disposed on a transparent substrate. Disposed on the first image layer is a diffuser layer configured to block the underlying image layer in ambient light. The underlying image is disposed on the diffuser layer and includes opaque regions and an image regions. When a backlight unit illuminates the underlying image layer, the first image is altered by changing color, adding effects to the image, and/or creating a new image. These effects are collectively referred to as a "composite image" because the image viewable to the user is a composite of the two image layers.

In a particular embodiment, the image panel is incorporated into an electronic device as, e.g., a back or side panel of the electronic device, and uses the backlight of the display unit to also illuminate the image panel. Thus, taking as an example a cellphone, the back panel of the phone may display a first image when the cellphone is in sleep mode, but upon activating the front display, the back panel will then display a composite image using the activated backlight unit. The concept applies to other electronic devices, especially other electronic devices that include displays and already incorporate a backlight, such as laptops, tablets, monitors, etc. These and other aspects and advantages will be described below and in relation to the figures. Embodiments of the image panel discussed herein are provided by way of example and not by way of limitation.

Figure 1:
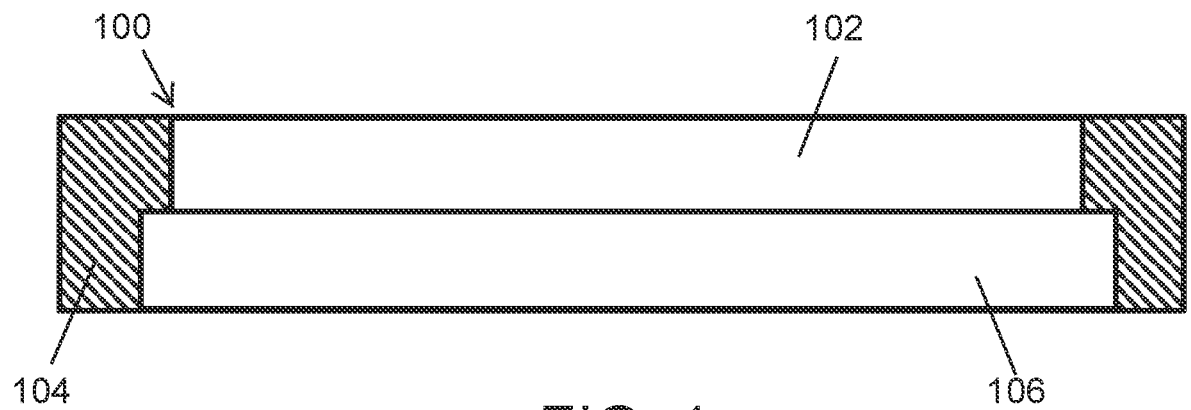
FIG. 1 depicts a schematic, partial cross-sectional view of a backlit image unit having an image panel configured to display a composite image, according to an exemplary embodiment.

FIG. 1 is a schematic cross-sectional view of a decorative or architectural panel, which will be referred to as an image unit 100. The image unit 100 includes an image panel 102 seated within a housing 104. Also disposed within the housing 104 is a backlight unit 106. The backlight unit 106 is positioned behind the image panel 102. As will be discussed below, the image unit 100 may be incorporated into another structure (e.g., an architectural structure, such as a wall, floor, ceiling, door, etc.) or device (e.g., an electronic device, such as a cellphone, laptop, monitor, tablet, etc.). In embodiments, the backlight unit 106 is at least one of an incandescent lamp, an LED array, an electroluminescent panel, cold cathode fluorescent lamps, hot cathode fluorescent lamps, external electrode fluorescent lamps, or an active display unit (as discussed below). In embodiments, the backlight unit 106 is configured to provide 300 lumens to 350 lumens of illumination on the image panel 102.

Figure 2:
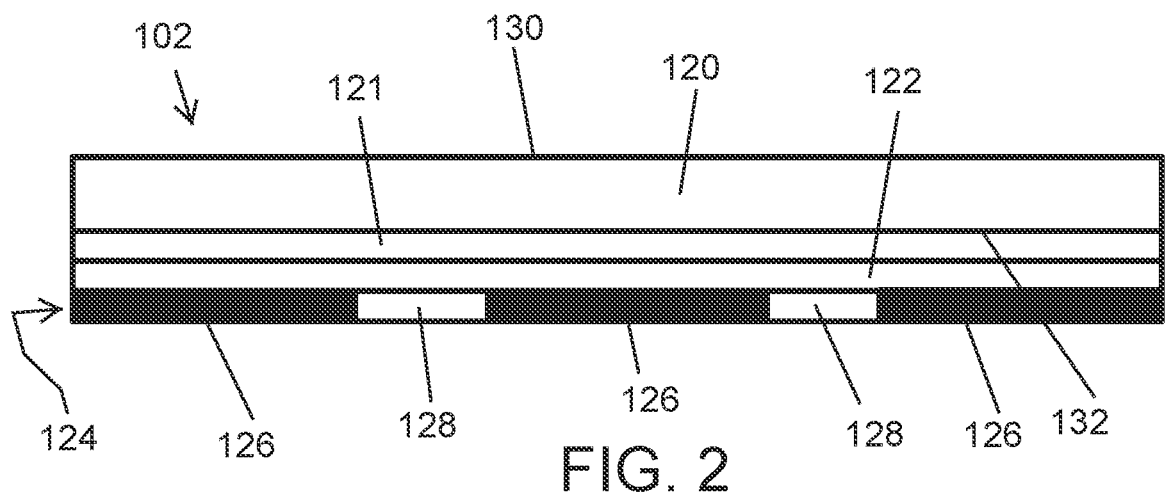
FIG. 2 depicts a schematic cross-sectional view of an image panel, according to an exemplary embodiment.

FIG. 2 depicts the structure of the image panel 102. As can be seen in FIG. 2, the image panel 102 includes a transparent substrate 120, a first image layer 121, a diffuser layer 122, and a second image layer 124. The second image layer 124 includes at least one opaque region 126 and at least one image region 128.

In embodiments, the substrate 120 is a transparent glass or plastic. For example, suitable glass substrates 120 may include at least one of silicates, soda lime silicates, borosilicates, aluminosilicates, aluminoborosilicates, alkali aluminosilicates, and alkaline earth aluminosilicates, among others. Such glasses may be chemically or thermally strengthened. A commercially available glass suitable for use is the transparent substrate is Gorilla® glass (available from Corning Incorporated, Corning, N.Y.). Suitable transparent plastic substrates 120 include polycarbonate or acrylic panels.

The substrate 120 has a first major surface 130 and a second major surface 132. The first major surface 130 is on the opposite side of the substrate 120 from the second major surface 132. In embodiments, the first major surface 130 is a viewing surface in that the first major surface is directed at a viewer. The second major surface 132 faces the backlight unit 106 (as shown in FIG. 1). As will be discussed more fully below, the first image layer 121 is illuminated by ambient lighting such that the first image layer is seen by the viewer when the backlight unit 106 is inactive. When the backlight unit 106 is active, the second major surface 132 is illuminated causing the viewer to see a composite image of the first image layer 121 and the image regions of the second image layer 124. The transparent substrate 120 has a thickness as defined by a distance between a first major surface 130 and a second major surface 132 of no more than 2 mm, no more than 0.7 mm, or no more than 0.55 mm. In embodiments, the transparent substrate 120 has a thickness of at least 0.1 mm, at least 0.2 mm, at least 0.3 mm, or at least 0.4 mm.

The first image layer 121 is disposed on the first major surface 130 or the second major surface 132 of the substrate 120. In embodiments, the first image layer 121 is disposed on the second major surface 132 so that the substrate 120 is between the viewer and the first image layer 121 so as to protect the first image layer 121 from damage. The first image layer 121 can be applied on the substrate 120 in a variety of ways. In an embodiment, the first image layer 121 is printed on the substrate 120 using a technique such as inkjet printing, slot printing, screen printing, pad printing, or gravure printing, among others. In another embodiment, the first image layer 121 is a decal or transfer that is adhered to the substrate 120. In embodiments, the first image layer 121 is semitransparent, having an optical density of 0.5 or less.

The diffuser layer 122 is disposed over the first image layer 121 and is designed to scatter and reflect light. In this way, the diffuser layer 122 enhances visibility of the first image layer 121 by reflecting ambient light passing through the semitransparent first image layer 121. Additionally, the diffuser layer 122 scatters light, including light that passes through the first image layer 121 and diffuser layer 122 to effectively hide the image regions 128 of the second image layer 124 when the backlight unit 106 is not active. In embodiments, the diffuser layer 122 has an optical density of 1.0 to 2.0. In embodiments, the diffuser layer 122 is a layer of white material. In particular embodiments, the diffuser layer 122 is a white ink layer. Further, in embodiments, the diffuser layer 122 can be made up of multiple layers or applications of white material, such as a white ink, until the desired total optical density of the diffuser layer 122 is reached. In embodiments, the total optical density of the substrate 120, first image layer 121, and diffuser layer 122 is from 1.5 to 2.5.

The second image layer 124 is disposed over the diffuser layer 122. As discussed above, the second image layer 124 includes one or more opaque regions 126 and one or more image regions 128. The opaque regions 126 are designed to block light from the backlight unit 106 from shining through the first image layer 121. Thus, the opaque regions 126 are made from a material configured to increase the overall optical density of the image panel to at least 3.0 in the opaque regions 126. In an embodiment, the opaque regions 126 are a black ink layer. The image regions 128 are semitransparent like the first image layer 121 and have an optical density of 0.5 or less. In this way, light is configured to travel from the backlight unit 106 through the image panel 106 in the image regions 128. Thus, the optical density of the image panel 102 in the image regions 128 is less than 3.0.

As with the first image layer 121, the second image layer 124 can be applied on the diffuser layer 122 using the above described printing or image transfer techniques. Further, in embodiments, the second image layer 124 can be applied to the image panel 106 in one or two steps. In an embodiment, the opaque regions 126 are applied in a first step to create essentially a negative of the second image. Thereafter, the image regions 124 are applied in a second step. Alternatively, the image regions 128 could be applied first, followed by the opaque regions 126. In another embodiment, the opaque regions 126 and the image regions 128 can be applied at the same time, e.g., by inkjet printing a continuous second image layer 124.

Figure 3A:
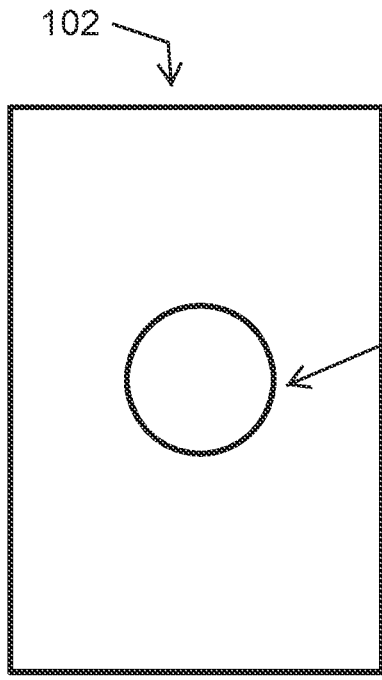
FIGS. 3A and 3B depict a transition of an image panel from a first image to a composite image having additional elements, according to an exemplary embodiment.
Figure 3B:
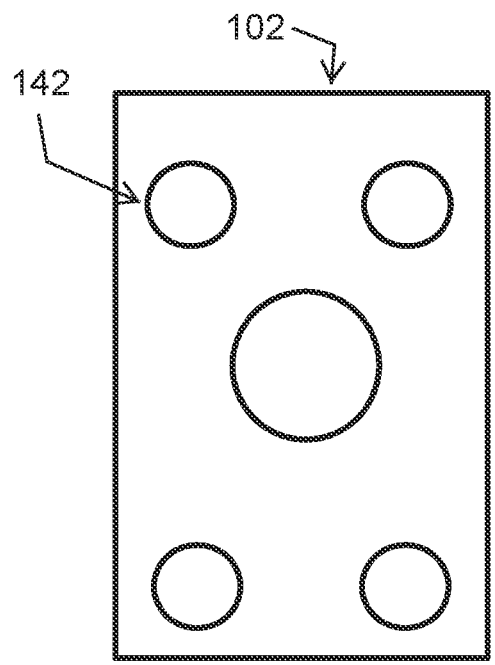

FIGS. 3A and 3B depict an example of the image panel 102 converting from the first image 140 (FIG. 3A) of the first image layer 121 to the composite image 142 (FIG. 3B) of the first image layer 121 and image regions 128. In this embodiment, the composite image 142 is one in which elements are added to the first image 140. As shown schematically, the first image 140 consists of a shape in the center of the image panel 102. When the image panel is illuminated by a backlight unit 106, the image regions 128 add elements to the corners of the image panel 102 to create the composite image 142.

Figure 4A:
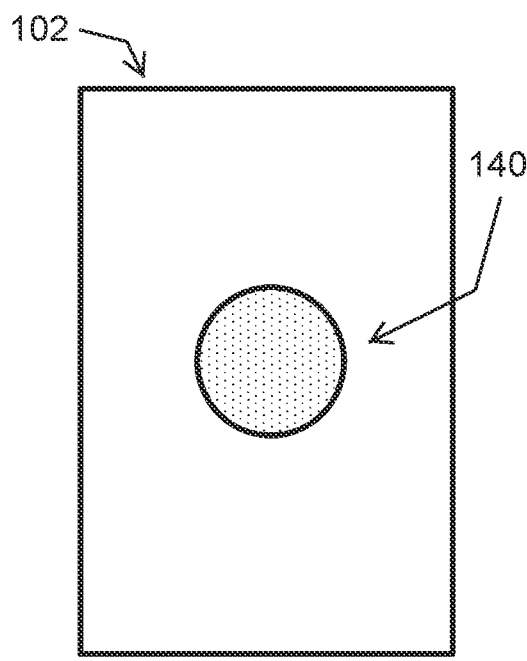
FIGS. 4A and 4B depict a transition of an image panel from a first image of a first color to a composite image of a second color, according to an exemplary embodiment.
Figure 4B:
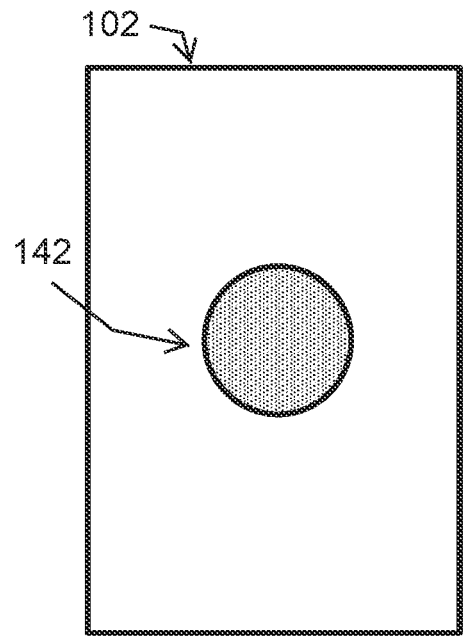

FIGS. 4A and 4B depict another example of the image panel 102 converting from a first image 140 (FIG. 4A) to a composite image 142 (FIG. 4B). This example demonstrates a color change of the first image 140. For example, the first image layer 140 is a first color (e.g., green) and the composite image 142 is a second color (e.g., orange). In order to arrive at the desired second color 142, a simulation can be performed using color wheels printed on separate substrates. For example, a first substrate can include a first image layer 121 of a first color wheel with a diffuser layer 122 disposed thereover. On the second substrate, a second color wheel is printed as the second image layer 124. Thereafter, a desired first color is selected and, having a desired second color in mind, the second color wheel on the second substrate is illuminated with a backlight and is rotated until the desired second color is illuminated at the location of the desired first color. In this way, the color of the image regions 128 of the second image layer 124 can be determined in order to produce the desired second color of the composite image 142 when mixed with the first color of the first image 140.

In embodiments, the selection of the colors can further be facilitated using the CMYK color model, which is a subtractive color model, along with halftoning. In particular, the backlight unit 106 may emit white light, and the first image 140 may subtract a combination of cyan, magenta, or yellow from the light to produce the first color. The second color may thus be selected to subtract additional amounts of cyan, magenta, or yellow from the light to produce the second color.

Once the two colors for the first image layer 121 and the image regions 128 of the second image layer 124 are selected, the densities of the image layers 121, 124 can be determined to produce the exact color desired when the image panel 102 is illuminated. In an embodiment, the first color is printed in varying densities horizontally or vertically across a first substrate, e.g., going from low density (10%) to high density (100%) in predetermined increments, and the diffuser layer is printed over the first color. The second color is then printed in the opposite direction (e.g., vertically if the first color is printed horizontally) across the second substrate. The substrates are then overlaid and placed over a backlight unit that illuminates the substrates, providing color mixing for the first and second colors at varying color densities.

Upon determining the colors for the first image layer 121 and the image regions 128 of the second image layer 124, the layers 121, 122, 124 can be printed or applied on the substrate 120 of the image panel 102.

FIGS. 5A and 5B depict an embodiment of creation of a new image as the composite image 142 (FIG. 5B) from the first image 140 (FIG. 5A). As shown in FIG. 5A, the first image 140 is of a circle, and as shown in FIG. 5B, the composite image 142 is of a square when the image panel 102 is illuminated by a backlight unit 106.

The examples depicted in FIGS. 3A-3B, 4A-4B, and 5A-5B are simplistic in nature and are meant to illustrate different possibilities for producing composite images 142. In practice, the composite image 142 may include combinations of two or more of the example transitions. For example, the first image shown in FIG. 3A may include a first color for the shape in the center of the image panel and a second color for the area surrounding the shape. Thus, when the image regions 128 are illuminated, the shapes in the corners will not only be shown but also be a combination of the underlying color of the image regions 128 and the surrounding color of the first image layer 121. In such an embodiment, the composite image 142 would exhibit both additional elements and a color change (e.g., as shown schematically in FIGS. 4A and 4B). Similarly, the center shape of FIG. 3A could also transform into a new image as demonstrated in FIG. 5B depending on the particular configuration of the second image layer 124.

FIG. 6 depicts an embodiment of the image unit 100 incorporated into an electronic device 200 as a back panel of the electronic device. In FIG. 6, the electronic device 200 includes a display unit 210 disposed behind a cover glass 220. The display unit 210 and cover glass 220 may have various intervening layers, such as touch-sensitive layers that provide touch functionality for interacting with the display unit 210. In embodiments, the electronic device 200 is, e.g., a cellphone, a tablet, a laptop, or a monitor, among other possibilities. The display unit 210 may be any one of a light emitting diode (LED) display device, an organic LED (OLED) display device, quantum dot (QLED) display device, plasma display device, or liquid crystal display (LCD) device, among others. The display unit 210 may incorporate a backlight unit 106 in which case the image panel 102 and display unit 210 may be backlit by the same backlight unit 106. In other embodiments, a separate backlight unit 106 is incorporated and faced rearward to provide backlighting for the image panel 102.

In embodiments, electronic device 200 has a sleep mode or an off mode in which the display unit 210 and backlight 106 are not active. In this mode, the first image 140 of the image panel 102 will be seen by a user. When a user activates the electronic device 200, the backlight unit 106 activates the display unit 210 and illuminates the image panel 102 to provide decorative or informational effect as the composite image 142 of the image panel 102.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An image panel, comprising:
    a transparent substrate comprising a first major surface and a second major surface, the second major surface being opposite the first major surface;
    a first image layer disposed on the second major surface of the transparent substrate;
    a diffuser layer disposed on the first image layer, wherein the diffuser layer reflects ambient light passing initially through the first image layer to enhance visibility of the first image layer through the transparent substrate from the ambient light;
    a second image layer disposed on the diffuser layer, the second image layer comprising at least one mask region and at least one image region, wherein the diffuser layer is configured to block visibility of the at least one image region from the ambient light;
    wherein an optical density of the image panel is at least 3.0 in the at least one mask region and less than 3.0 in the at least one image region; and
    wherein the at least one image region is visible from the first major surface of the transparent substrate and forms a composite image with the first image layer when the second major surface of the transparent substrate is backlit.

2. The image panel of claim 1, wherein, when the second major surface is backlit, light is transmitted through inks of the at least one image region and the first image layer to form the composite image.

3. The image panel of claim 2, wherein a first ink of the at least one image region and a second ink of the first image layer are semitransparent and comprise optical densities of 0.5 or less.

4. The image panel of claim 1, wherein the transparent substrate is at least one of a glass or a plastic.

5. The image panel of claim 1, wherein the first image layer comprises an optical density of 0.5 or less.

6. The image panel of claim 1, wherein the optical density of the diffuser layer is from 1.0 to 2.0.

7. The image panel of claim 1, wherein the optical density of the at least one image region of the second image layer is 0.5 or less.

8. The image panel of claim 1, wherein, in the at least one image region, the first image layer comprises a first color having first CMYK values, the second image layer comprises a second color having second CMYK values, and the composite image comprises a third color having third CMYK values that are different from the first CMYK values and the second CMYK values.

9. The image panel of claim 1, wherein the first image layer comprises a decal adhered to the second major surface of the transparent substrate.

10. The image panel of claim 1, wherein the first image layer comprises an ink layer printed onto the second major surface of the transparent substrate.

11. The image panel of claim 1, wherein the diffuser layer comprises one or more white ink layers printed onto the first image layer.

12. The image panel of claim 1, wherein the at least one mask region comprises black ink printed onto the diffuser layer.

13. The image panel of claim 1, wherein the at least one image region comprises an ink region disposed on the diffuser layer.

* * * * *